United States Patent
Lee et al.

(10) Patent No.: US 7,092,396 B2
(45) Date of Patent: Aug. 15, 2006

(54) ASYNCHRONOUS TRANSFER MODE (ATM) BASED DELAY ADAPTIVE SCHEDULING APPARATUS ADAPTIVE ACCORDING TO TRAFFIC TYPES AND METHOD THEREOF

(75) Inventors: Sang-ho Lee, Seoul (KR); Young-hwan Oh, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 938 days.

(21) Appl. No.: 10/032,097

(22) Filed: Dec. 31, 2001

(65) Prior Publication Data
US 2003/0002439 A1   Jan. 2, 2003

(30) Foreign Application Priority Data
Jun. 23, 2001   (KR) ............................... 2001-36013

(51) Int. Cl.
*H04L 12/56* (2006.01)
(52) U.S. Cl. ................. 370/395.4; 370/230.1
(58) Field of Classification Search ................ 370/395, 370/378, 379, 412
See application file for complete search history.

(56) References Cited

U.S. PATENT DOCUMENTS

| | | | |
|---|---|---|---|
| 5,850,399 A * | 12/1998 | Ganmukhi et al. | 370/412 |
| 6,058,114 A * | 5/2000 | Sethuram et al. | 370/397 |
| 6,272,109 B1 * | 8/2001 | Pei et al. | 370/230 |
| 6,483,839 B1 * | 11/2002 | Gemar et al. | 370/395.42 |
| 6,526,062 B1 * | 2/2003 | Milliken et al. | 370/395.42 |
| 6,834,053 B1 * | 12/2004 | Stacey et al. | 370/395.4 |
| 6,888,830 B1 * | 5/2005 | Snyder, II et al. | 370/392 |

* cited by examiner

*Primary Examiner*—Brian Nguyen
(74) *Attorney, Agent, or Firm*—Sughrue Mion, PLLC (57) ABSTRACT

An ATM-based delay adaptive scheduling apparatus adaptive according to a traffic type and method thereof. A scheduling portion categorizes an input cell according to the traffic type, and generates service information of the cell suitably for the traffic type of the cells. A controlling portion determines a priority of cell service provision based on the service information, and an outputting portion reads a corresponding cell from the storing portion according to the service providing priority determined by the controlling portion, and outputs the read cell to an ATM switch. By generating the service information of each cell in the form of a tag, and by determining a priority of service provision according to the generated service information, an adequate QoS is guaranteed for each traffic type under a multi-traffic environment, and an efficient use of bandwidth provided in a current network is achieved by using the characteristics of each traffic type.

11 Claims, 6 Drawing Sheets

ASYNCHRONOUS TRANSFER MODE (ATM) BASED DELAY ADAPTIVE SCHEDULING APPARATUS ADAPTIVE ACCORDING TO TRAFFIC TYPES AND METHOD THEREOF

BACKGROUND OF THE INVENTION

1. Field of the Invention

The present invention relates to an asynchronous transfer mode (ATM) based delay adaptive scheduling apparatus adaptive according to traffic types and method thereof, and more particularly to an ATM-based delay adaptive scheduling apparatus that is adaptive to a delay time generated at an exchange node based on traffic characteristics and quality of service (QoS) provided in a traffic setting step, and a method thereof. The present invention is based on Korean Patent Application 2001-36013 filed on Jun. 23, 2001, which is incorporated herein by reference.

2. Description of the Related Art

With technological developments in high speed switching and optical transmission fields, data transmission at high speed and wideband service at a speed ranging from several hundred Mbps to several dozens of Gbps were enabled. Meanwhile, a broadband integrated services digital network (B-ISDN) based on an asynchronous transfer mode (ATM) provides wideband multi-media services including video on demand (VOD), video conference, etc.

One of the most important preconditions for supporting the wideband multi-media services in terms of network design is to guarantee bandwidth sufficient for efficient provision of services. Further, for a network provider and a user, use of bandwidth has to be optimized during initial connection in the network as constructed. Accordingly, there will be an agreement between the provider and the user for a proper QoS for each traffic type, and here, an average delay becomes an essential factor that determines conditions for QoS demand. Accordingly, importance of a delay boundary at an intermediary node is emphasized.

For an ATM network, various algorithms have been suggested, like a scheduling algorithm for reallocating the bandwidth according to demands of respective sources, and an algorithm that is fast, efficient, and suitable for limited performance. References can be found in "*A service architecture for ATM: from application to scheduling, IEEE network*, pp. 6–14, May/June 1996" by Mark W. Garrett, and "*Start-time fair queuing: A scheduling algorithm for integrated services packet switching networking*, Vol. 5, No. 5, pp. 690–704, October 1997" by Pawan Goyal, Harrick M. Vin, and Haichen Cheng on the field of IEEE/ACM networking.

Most algorithms, however, cannot distinguish traffic sensitive to time during scheduling from traffic sensitive to damage. Accordingly, a delay boundary between end points required by the traffic sensitive to time, cannot be guaranteed. In order to guarantee the delay boundary between the end points as required by the traffic sensitive to time, there occurs a waste of bandwidth. This problem is specified in a doctorate thesis titled "*Research on an efficient operation of a port of an output buffer type ATM switch*" (Dr. Ho-yong Ryu. PhD. Dissertation. Kwangwoon University. 1998. A duplicated copy obtainable from the library of Kwangwoon University).

The algorithm like fair queuing (FQ) that is operated by a round-robin scheduling has a drawback that it could not provide different bandwidths for respective sources. Suggestions to solve this problem are: weighted fair queuing (SFQ) and a generalized processing sharing (GPS). References to the SFQ and GPS can be found in "*Design of a weighted fair queuing cell scheduler for ATM network, IEEE Globelcom*98, Vol. 1, pp. 405–410, November 1998" contributed by Yuhua Chen and Jonathan S. Turner on *the IEEE Globelcom*, and the "*Bandwidth allocation of r-multiple qualities of service using generalized processor sharing, IEEE transactions on information theory*, Vol. 42, No. 1, pp. 268–272, January 1996" by G. De Veciana and George Kesidis.

In the input queuing switching system using the above queuing model, however, output conflict and head of line blocking cause delay between end points and subsequent reduction of processing ratio. Further, in the multi-traffic conditions, in order to ensure QoS for the respective traffic types, ATM forum TM 4.0 allocates a priority to each traffic type, and the priority serves as an important reference to determine the order of transmission during the scheduling process.

Figure 1:
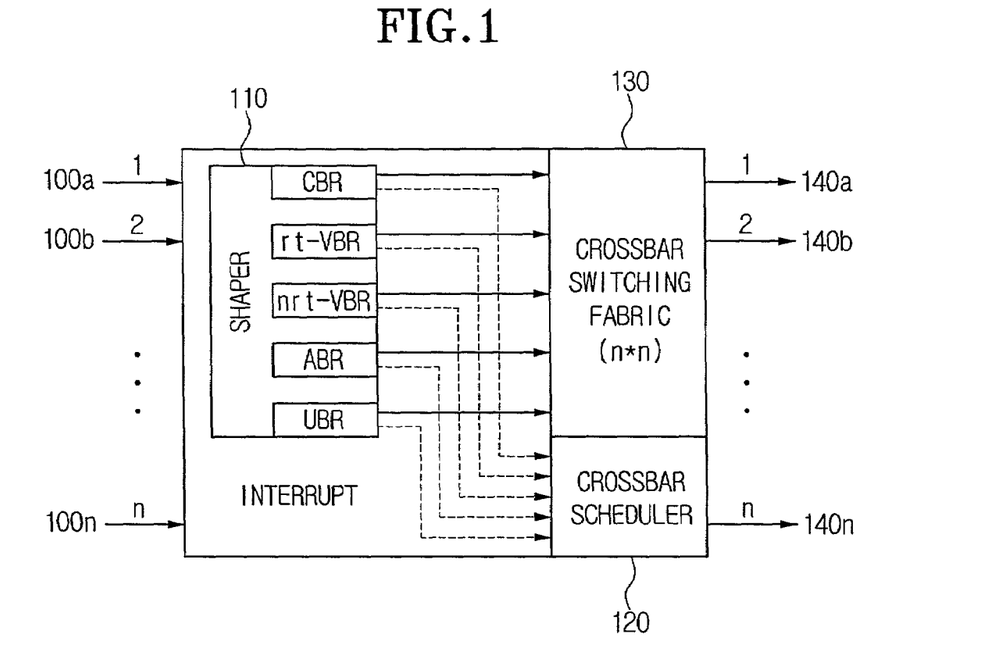
FIG. 1 is a view showing the construction of a system of a conventional input buffering type crossbar relaying algorithm.

FIG. 1 is a view showing the structure of a system for a conventional input buffering type crossbar relaying algorithm.

Referring to FIG. 1, when a cell arrives at one of the input ends (100$a$ through 100$n$), a shaper 110 applies the traffic characteristic of the input cell into a predetermined traffic type. A crossbar scheduler 120 determines whether to provide service or not based on the priority determined in accordance with the traffic type of the input cell. A crossbar switching fabric 130 transmits the cell to a corresponding output end (140$a$ through 140$n$), and accordingly, the cell is transmitted through the corresponding output end (140$a$ through 140$n$).

Figure 2:
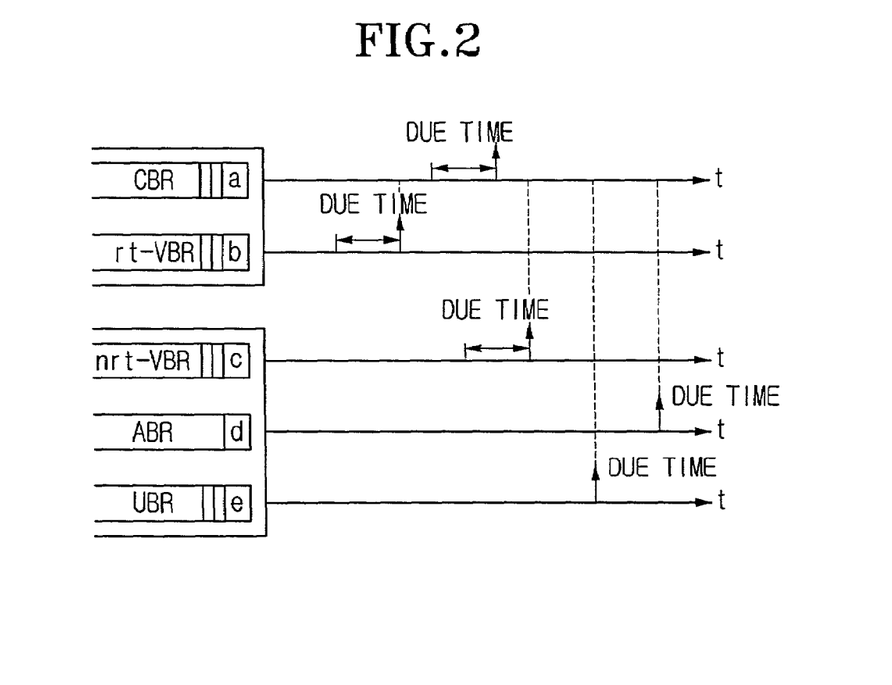
FIG. 2 is a view showing an order of transmission of cells input in the system of the conventional input buffering type crossbar relaying algorithm.

FIG. 2 shows an order of transmission of each cell input in the system for the conventional input buffering type crossbar relaying algorithm. When the cells shown in FIG. 2 are in queue, regardless of service finish time preset for each cell, the cells are serviced by an order of constant bit rate (CBR), real-time variable bit rate (rt-VBR), non-real time variable bit rate (nrt-VBR), available bit rate (ABR), and unspecified bit rate (UBR). Accordingly, the low priority cells are waiting in queue until the higher priority cells are serviced, resulting in a waste of available bandwidths.

SUMMARY OF THE INVENTION

The present invention has been made to overcome the above-mentioned problems of the related art, and accordingly, it is an object of the present invention to provide an ATM-based delay adaptive scheduling apparatus adaptive according to the traffic types, performing scheduling procedure adaptively to the transmission delay time. The apparatus is capable of utilizing idling bandwidth at a maximum level and thus reducing an average delay time of a cell by providing various available bandwidths to each of different sources, by guaranteeing QoS for the traffic type of each input cell and impartial transmission and a method thereof.

The above object is accomplished by an ATM-based delay adaptive scheduling apparatus adaptive according to a traffic type in accordance with the present invention, including a scheduling portion that categorizes a cell according to the traffic type and generates service information including the traffic type, a priority of service provision, and a service finish time, a storing portion that stores a cell about which service information is generated, an outputting portion that reads a cell, which is decided to be serviced, from the storing portion, and then outputs the read cell, an input/output managing portion that counts the cell input to the scheduling portion and output from the outputting portion, and manages an input/output of the cell, and a controlling portion that decides whether to service the cell or not based on the service information, and outputs a control signal command to read the cell stored in the storing portion and to output the read cell.

The scheduling portion includes a categorizing portion that categorizes the cell according to the traffic type, and a generating portion that generates the service information of the cell including the traffic type of the cell, the priority of service provision, and the service finish time.

Preferably, with respect to the CBR type cell, the generating portion generates service information including the traffic type, priority of service provision, and service finish time, while, with respect to the rt-VBR, nrt-VBR, ABR and UBR traffic type cells, generating service information including the traffic type, priority of service provision, service finish time, and an address of a field where the cells are written.

Preferably, the storing portion includes a first storing portion that stores the cells of traffic type allocated with fixed bandwidth, and a second storing portion that stores the cells of traffic type allocated with variable bandwidth.

Preferably, the outputting portion includes a cell reading portion that reads the cells decided by the controlling portion to be serviced and stored at a storage address. The cell reading portion outputs the read cells to an ATM switch.

The input/output managing portion includes a buffer controlling portion that controls an occupancy capacity of the storing portion below a predetermined threshold by comparing the occupancy capacity with the predetermined threshold, an input cell counting portion that counts the input cells and outputs the cells to the buffer controlling portion, and an output cell counting portion that counts the cells output from the outputting portion and serviced, and outputs the cells to the buffer controlling portion.

The controlling portion includes an inquiry portion that inquires about the traffic type of the cells in the storing portion according to the service information, and a service deciding portion that decides whether to service the cell of low priority or not, by comparing the service finish time of the cell of high priority with the service finish time of all cells based on the result of the inquiry of the inquiry portion. Here, a storage address of the cell, which is decided to be serviced, is output to the outputting portion.

A method for ATM-based delay adaptation according to a traffic type in accordance with the present invention includes the steps of (a) categorizing a cell according to the traffic type and generating service information including the traffic type, a priority of service provision, and a service finish time, (b) deciding whether to service the cell or not based on the service information, and (c) outputting the cell that is decided to be serviced.

The step (a) includes the sub-steps of (a1) categorizing the cell according to the traffic type, (a2) generating the service information of the cell including the traffic type, the priority of service provision, and the service finish time, and (a3) storing the cell and the service information.

The step (b) includes the sub-steps of (b1) inquiring about the traffic type according to the service information, (b2) deciding whether to service a cell of low priority or not, by comparing the service finish time of a cell of high priority with the service finish time of all cells, and (b3) outputting a storage address of a cell that is decided to be serviced in the sub-step (b2).

The sub-steps (b1) through (b3) are repeated with respect to the cell of high priority when it is decided not to service the cell of low priority.

The sub-step (b3) reads the cells decided to be serviced and stored at the storage address and outputs the cells to an ATM switch.

The method for ATM-based delay adaptation according to a traffic type in accordance with the present invention further includes the step (d) comparing an occupancy capacity of storing means where the cell is stored, with a predetermined threshold, and then regulating the occupancy capacity below the predetermined threshold.

In the sub-step (d), the value of occupancy capacity of the storing means is obtained by counting the input cells and serviced cells. If the occupancy capacity exceeds the predetermined threshold, it is preferable that the input of the cells be interrupted.

When there is extra bandwidth, based on the service information that is generated with respect to the input cells, the cells of low priority can be transmitted. Accordingly, average delay time for each cell is reduced, which means more data is processed within the same period of time. As a result, the quality of the switch can be improved.

BRIEF DESCRIPTION OF THE DRAWINGS

The above-mentioned objects and the feature of the present invention will be more apparent by describing the preferred embodiment of the present invention in detail referring to the appended drawings, in which.

DETAILED DESCRIPTION OF PREFERRED EMBODIMENT

Detailed description according to the preferred embodiment of the present invention will follow referring to the attached drawings, while the like elements are given the same reference numerals throughout.

Figure 3:
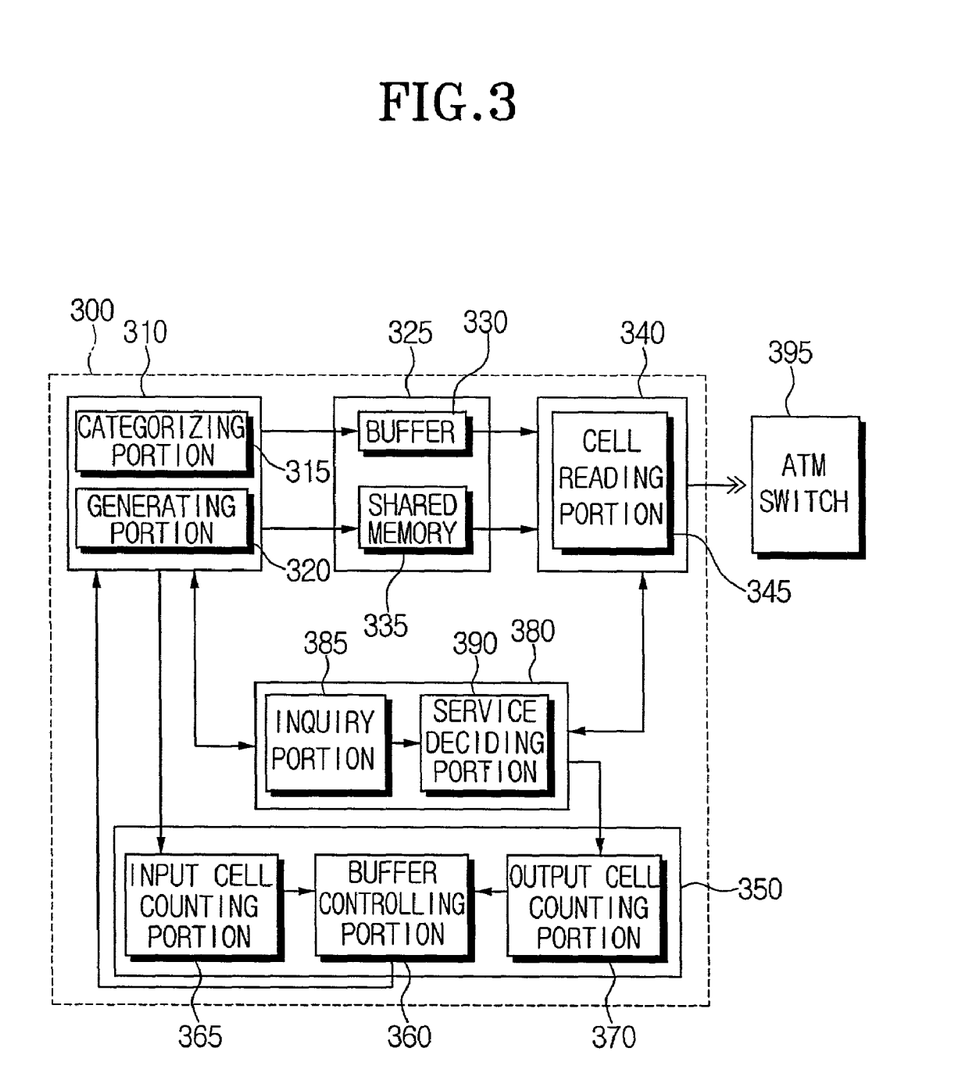
FIG. 3 is a block diagram showing an internal construction of an ATM-based delay adaptive scheduling apparatus adaptive according to the traffic types in accordance with a preferred embodiment of the present invention.

FIG. 3 is a block diagram showing the internal construction of the ATM-based delay adaptive scheduling apparatus adaptive according to the traffic types in accordance with the preferred embodiment of the present invention.

Referring to FIG. 3, the ATM-based delay adaptive scheduling apparatus 300 includes a scheduling portion 310, a storing portion 325, an outputting portion 340, an input/output managing portion 350, and a controlling portion 380.

The scheduling portion 310 includes a categorizing portion 315 that categorizes the cells according to each traffic type, and a generating portion 320 that generates service information inclusive of traffic type of the cell, priority of service provision, and service finish time. The service finish time is aimed to ensure QoS for each cell. The service finish time is an amount of time that is taken to service the cell. The service information generated from the scheduling portion 310 is output to the controlling portion 380.

The categorizing portion 315 can be in the form of a shaper that changes the characteristic of the traffic in order to apply the cell under a previously contracted traffic type. In this case, the shaper changes the traffic characteristic of the input cell and categorizes the input cells according to the traffic type.

The generating portion 320 generates service information about each of the cells that are categorized by the categorizing portion 315. The service information is indicated in the form of a tag in the cell. For the cells of constant bit rate (CBR), the service information includes traffic type, priority of service provision, and service finish time. For the cells of real-time variable bit rate (rt-VBR), non-real-time variable bit rate (nrt-VBR), available bit rate (ABR), and unspecified bit rate (UBR), the service information includes the traffic types, priority of bits, service finish time, and points of shared memory.

The storing portion 325 preferably includes a buffer 330 where the cells like CBR cell, that are allocated with fixed bandwidth, are stored, and a shared memory 335 where the cells like rt-VBR, nrt-VBR, ABR, and UBR, that are allocated with variable bandwidths, are stored. The storing portion 325 stores the cells whose service information is generated by the scheduling portion 310.

The outputting portion 340 includes a cell reading portion 345 that reads the cell that is decided by the controlling portion to be serviced. The outputting portion 340 outputs the cell read by the cell reading portion 345 to the ATM switch 395. Meanwhile, when the cell is output to the ATM switch 395, the controlling portion 380 notifies the input/output managing portion about the output of the cell.

The input/output managing portion 350 includes a buffer controlling portion 360 that compares an occupancy capacity of the storing portion 325 with a predetermined threshold, and controls the occupancy capacity below the threshold, an input cell counting portion 365 that counts and outputs the input cell count value to the buffer controlling portion 360, and an output cell counting portion 370 that counts the serviced cells and outputs the output cell count value to the buffer controlling portion 360.

The input cell counting portion 365 receives the cells input from the scheduling portion 310, and notifies the buffer controlling portion 360 about input cell count value, which is an increased value from the number of input cells. At this time, the input cell counting portion 365 may count the cells according to the traffic types of the cells, i.e., the input cell counting portion 365 may count the cells of CBR traffic and the cells of other traffic types, respectively.

The output cell counting portion 370 receives information about the serviced cells from the controlling portion 380, and transfers the output cell count value to the buffer controlling portion 360. Similar to the input cell counting portion 365, the output cell counting portion 370 may count the cells according to the traffic types of the cells, i.e., the output cell counting portion 370 may count the cells of CBR traffic and the cells of other traffic types, respectively.

The buffer controlling portion 360 compares the occupancy capacity of the buffer 330 and the shared memory 335 with a predetermined threshold, and controls the occupancy capacity below the predetermined threshold. The threshold is preferably set below a full capacity of the buffer 330 and the shared memory 335 (e.g., 90% of the full capacity). With the input cell count value and the output cell count value, the buffer controlling portion 360 is enabled to analyze the current occupancy capacity of the storing portion 325. If the occupancy capacity exceeds the predetermined threshold, the buffer controlling portion 360 outputs a control signal to the scheduling portion, the control signal directs an interrupting of the input of cells to the scheduling portion 310.

The controlling portion 380 includes an inquiry portion 385 that inquires about traffic type of the input cells according to the service information, and a service deciding portion 390 that decides whether to provide service or not with respect to the cells of low priority, by comparing the service finish time of the cells of higher priority with the service finish time of all the cells based on the information obtained by the inquiry portion 385. The controlling portion 380 outputs to the outputting portion 340 a storage address of the cell to be serviced. Further, the controlling portion 380 controls operations of the respective components inclusive of the scheduling portion 310, the outputting portion 340, and the input/output managing portion 350.

The service deciding portion 390 preferably repeats the process of deciding whether to service the cell of the high priority or not, when there is no cell of low priority decided to be serviced in the storing portion 325.

Figure 4:
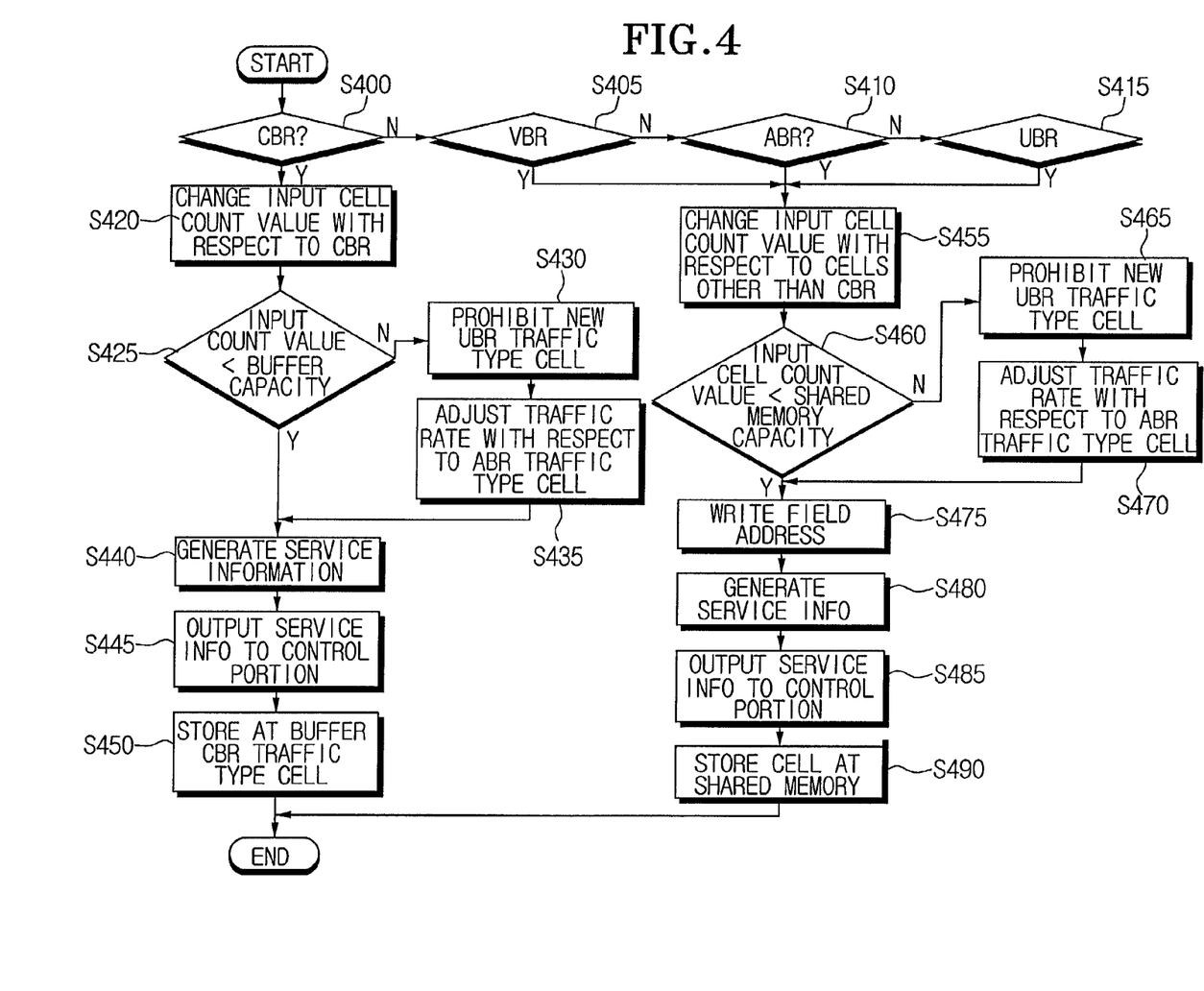
FIG. 4 is a flowchart illustrating a process of generating service information at the ATM-based delay adaptive scheduling apparatus in accordance with the present invention.

FIG. 4 is a flowchart showing the process of generating service information at the ATM-based delay adaptive scheduling apparatus.

Referring to FIG. 4, when the cell is input to the scheduling portion 310, the categorizing portion 315 categorizes the input cells into respective categories according to the traffic types (steps S410, S415). The traffic types of the input cells include at least one of CBR, rt-VBR, nrt-VBR, ABR and UBR cells.

When the input cell is a CBR traffic type, the scheduling portion 310 outputs a signal that directs the input cell counting portion 365 to increase the input cell count value (step S420). The input cell counting portion 365 transmits the input cell count value to the buffer controlling portion 360, and the buffer controlling portion 360 compares the input cell count value with a predetermined threshold (e.g. full, or 90% of buffer capacity) (step S425). Here, the input cell counting portion 365 may count the cells of CBR traffic separately, and in this case, the threshold can be set separately with respect to the cells of CBR traffic that uses the buffer. When the input cell count value is below the predetermined threshold, the service information generating step is executed (S440). When the input cell count value exceeds the predetermined threshold, the input of new UBR traffic cells is interrupted (step S430), and a traffic rate of the ABR traffic rate is regulated (step S435).

When the input cell count value is below the predetermined threshold in S425, the generating portion 320 generates service information in the form of a tag (step S440). Here, the service information includes traffic type, priority of service provision and service finish time. The generated service information is input to the controlling portion 380

(step S445), and CBR traffic cells, whose service information has been generated, are input to the buffer 330 (step S450).

Meanwhile, when the input cells are other than the CBR traffic cells, the categorizing portion 315 determines whether the cells are VBR (rt-VBR and nrt-VBR), ABR and UBR, sequentially (step S405 through S415). If the input cell is one of either ABR or UBR cells, the scheduling portion 310 outputs a signal that directs the input cell counting portion 365 to increase the input cell count value (step S455).

The input cell counting portion 365 transmits the input cell count value to the buffer controlling portion 360, and the buffer controlling portion 360 compares the input cell count value with a predetermined threshold (e.g., full, or 90% of shared memory capacity) (step S460). At this time, the input cell counting portion 365 may count the CBR traffic cells separately, and in this case, the predetermined threshold may be set separately for the VBR (rt-VBR and nrt-VBR), ABR and UBR traffic cells that use the shared memory 335. When the input cell count value is below the predetermined threshold, the service information generating step is executed. When the input cell count value is greater than or equal to the predetermined threshold, input of new UBR traffic cells is interrupted (step S465), and the traffic rate of the ABR traffic cells is regulated (step S470).

When the input cell count value is below the predetermined threshold in S460, the generating portion 320 generates the service information in the form of a tag (step S480). The service information includes the traffic type, priority of service provision, service finishing type and field address of the shared memory 335 where the input cells are stored. The generated service information is input to the controlling portion 380 (step S485), and the VBR (rt-VBR and nrt-VBR), ABR and UBR traffic cells, whose service information are generated, are input to the shared memory 335 (step S490).

Figure 5:
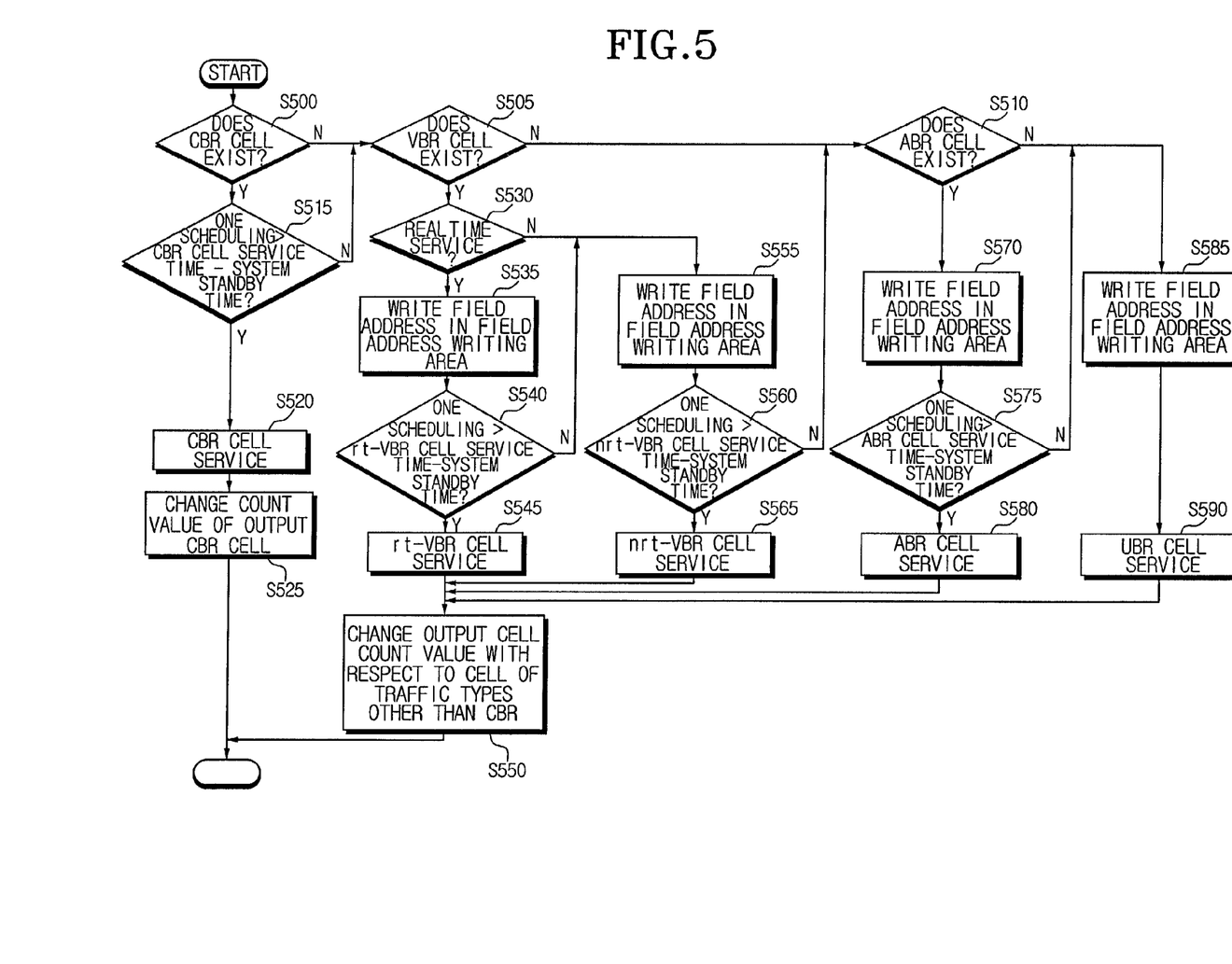
FIG. 5 is a flowchart illustrating a process of deciding a cell to be serviced in accordance with the service information at the ATM-based delay adaptive scheduling apparatus in accordance with the present invention.

FIG. 5 is a flowchart showing a process of determining the cells to be serviced in accordance with the service information, in the ATM-based delay adaptive scheduling apparatus of the present invention, which is adaptive according to the traffic types.

Referring to FIG. 5, based on the service information, the inquiry portion 385 inquires whether the CBR traffic type of cells exist in the buffer 330 (step S500). If there is CBR traffic type of cells existing in the buffer 330, the service deciding portion 390 compares the time taken to perform the scheduling process once with a value obtained by subtracting a system standby time from the CBR traffic cell service finish time (step S515). The system standby time is a time taken to prepare the system for the next cell service. This relation will be expressed by, $$R_u > t_1 - t_x$$ [Expression 1]

In the Expression 1, $R_u$ is the time taken to perform the scheduling process once, and $t_1$ is the service finish time for a corresponding CBR traffic type cell, and $t_x$ is the system standby time for preparing for the next cell service.

If $R_u$ is greater than $t_1 - t_x$, the controlling portion 380 outputs to the outputting portion 340 a signal that directs the outputting portion 340 to read the corresponding CBR traffic type cell from the buffer 330 and to output the read cell to an ATM switch. Accordingly, under the control signal from the controlling portion 380, the reading portion 340 outputs the corresponding cell to the ATM switch (step S520).

Upon receipt of the notification from the controlling portion 380 about the output of the CBR traffic type cell, the output cell counting portion 370 subtracts the output cells from the whole CBR type cells to be serviced, and transmits the changed output cell count value to the buffer controlling portion 360 (step S525). Accordingly, the buffer controlling portion 360 is enabled to analyze the current occupancy capacity of the buffer 330.

Meanwhile, if there is no CBR traffic type cell, or if $R_u$ is less than or equal to $t_1 - t_x$, the inquiry portion 385 inquires as to whether there is a VBR traffic type cell existing in the shared memory 335 based on the service information (step S505). If there is a VBR traffic type cell existing in the shared memory 335, the inquiry portion 385 inquires as to whether the VBR traffic type cell requires real time service, i.e., the inquiry portion 385 inquires as to whether the VBR traffic type cell is a rt-VBR or nrt-VBR cell (step S530). If the corresponding cell is the rt-VBR traffic type cell, the controlling portion 380 writes a field address of the corresponding cell in the place where the field address of the to-be-output cell is written (step S535).

The service deciding portion 390 determines whether to provide corresponding cell service or not through the same process as S515, and accordingly, the controlling portion 380 outputs to the outputting portion 340 a control signal for outputting the field address of the cell to be serviced (step S540). By using the addresses input from the controlling portion 380, the outputting portion 340 reads the corresponding cell from the shared memory 335, and outputs the cell to the ATM switch (step S545).

Upon receipt of the notification about the output of the rt-VBR traffic type cell from the controlling portion 380, the output cell counting portion 370 subtracts the output cells from all the cells to be serviced (exclusive of CBR traffic type cells), and transmits the changed output cell count value to the buffer controlling portion 360 (step S550). Accordingly, the buffer controlling portion 360 is enabled to analyze the current occupancy capacity of the buffer 330.

If the VBR traffic type cells are identified as the nrt-VBR traffic type cells in S530, or if the value of time taken to perform the scheduling process once is less than or equal to the value that is obtained by subtracting the system standby time for the next cell service from the corresponding rt-VBR traffic type cell service finish time in S540, through the identical processes of S535 through S550, the nrt-VBR traffic type cells are serviced (steps S555 through S565 and S550). If the value of time taken to perform the scheduling process once is less than or equal to the value that is obtained by subtracting the system standby time for the next cell service from the corresponding nrt-VBR traffic type cell service finish time, the nrt-VBR traffic type cells are not serviced, and S510 is directly executed.

If it is determined that the ABR traffic type cells exist in S510, since provision of service is determined through the processes identical to the service processes of the VBR traffic type cells described above (S570 through S580), description thereof will be omitted. If it is determined that there is no ABR traffic type cells in S510, or if the value for time taken to perform the scheduling process once is less than or equal to the value that is obtained by subtracting the system standby time for the next cell service from the corresponding ABR traffic type cell service finish time, the controlling portion 380 writes a field address of the UBR traffic type cell in a place where the field address of the cell to be output is written (step S585).

The outputting portion 340 uses the address input from the controlling portion 380 to read the corresponding cell from the shared memory 335 and to output the read cell to the ATM switch (step S590). Upon receipt of the notification from the controlling portion 380 about the output of the UBR traffic type cell, the output cell counting portion 370 subtracts the output cell from the whole cells, exclusive of the CBR type cells, and transmits the changed output cell counting value to the buffer controlling portion 360 (step S550).

FIGS. 4 and 5 show the generation of service information and the cell service using the generated service information for one scheduling process for a convenience of explanation. However, the generation of the service information and the cell service using the service information of FIGS. 4 and 5 are repeated.

Figure 6:
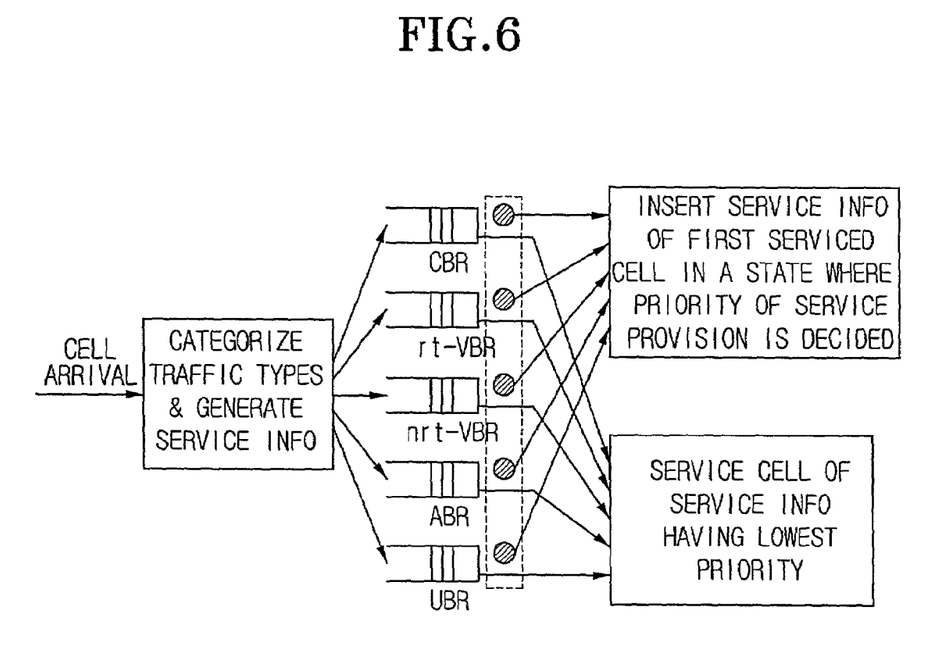
FIG. 6 is a schematic view showing processes of generating the service information and deciding the cell to be serviced among the input cells in the ATM-based delay adaptive apparatus in accordance with the present invention.

FIG. 6 is a view schematically showing the generation of service information and determination of the cells to be serviced in the ATM-based delay adaptive scheduling apparatus in accordance with the present invention.

Referring to FIG. 6, upon arrival of the cells, the scheduling portion 310 categorizes the cells by the traffic types, and generates service information. According to the traffic types, the cells are categorized into the CBR, rt-VBR, nrt-VBR, ABR and UBR cells, and the service information of the first cell to be serviced is input to the controlling portion 380. The controlling portion 380 determines the order of the cells for service, while also determining whether to service the cell of the lowest order.

Referring to FIGS. 5 and 6, in the ATM-based delay adaptive scheduling apparatus in accordance with the present invention, the order of the cells, input in the forms as shown in FIG. 2, is as follows:

FIG. 2 shows an example of when the cells of all traffic types, i.e., the CBR, rt-VBR, nrt-VBR, ABR and UBR cells, arrive. In FIG. 2, the service finish time applies only to the CBR, rt-VBR and nrt-VBR cells. For the other cells, i.e., for the ABR and UBR traffic type cells, the service finish time means standby time. This is because service of the ABR and UBR traffic type cells are not required in real time basis such as an e-mail, and the service can be requested again any time if the service is not completed within a predetermined standby time.

From FIG. 2, it can be seen that the cell that requires the shortest service finish time is the rt-VBR cell, and there is a margin between the input time and the service finish time for the rt-VBR traffic type cell. Accordingly, the UBR traffic type cell, which has the lowest priority, can be serviced.

In conclusion, the order for service provision is determined based on the service finish time, and as shown in FIG. 2, if there is time before the service finish time of the first cell, the UBR, rt-VBR, CBR, nrt-VBR and ABR cells are serviced by order. If it is unlike FIG. 2, i.e., if there is no lowest priority cell existing in the storing portion 325, the processes described with reference to FIG. 5 are repeated and the order of service provision is re-defined and the service is provided by the re-defined order.

In a situation where there are (k) number of cells existing in the input buffer type system, the comparison of the average queuing time between the conventional service method and the ATM-based delay adaptive scheduling apparatus and method in accordance with the present invention is as follows:

First, the average queuing time for the service of cells of the respective traffic types are obtained by the following expressions. Here, the elements used in the expressions are:

K: total number of cells existing in the system
$k_c$: number of CBR cells existing in the system
$k_r$: number of rt-VBR cells existing in the system
$k_n$: number of rt-VBR cells existing in the system
$k_a$: number of ABR cells existing in the system
$k_u$: number of UBR cells existing in the system $$k = k_c + k_r + k_n + k_a + k_u$$

$\tau p$: processing time for one cell
$\tau_x$: standby time for next cell service
$P_d$: margin possibility First, the average queuing time for the CBR cell is as follows:

$$c_T = \frac{\sum_{c=1}^{k_c}(c-1)((\tau_{pc}+\tau_{pr})+\tau_x)}{k_c} = \frac{\sum_{c=1}^{k_c}(c-1)(\tau_p+\tau_x)}{k_c} \qquad \text{[Expression 2]}$$

In the conventional service providing method, the cells of the low priority are serviced only after the cells of high priority are serviced. Accordingly, the average queuing time for the rt-VBR cells is obtained by, $$r_T = \frac{\sum_{r=1}^{(k_c+k_r)}(r-1)(\tau_P+\tau_x) - \sum_{c=1}^{k_c}(r-1)(\tau_P+\tau_x)}{k_r} = \frac{\sum_{r=(k_c+1)}^{(k_c+k_r)}(r-1)(\tau_P+\tau_x)}{k_r} \qquad \text{[Expression 3]}$$

Likewise, the average queuing time for nrt-VBR, ABR and UBR cells is respectively obtained by, $$n_T = \frac{\sum_{r=(k_c+k_r+1)}^{(k_c+k_r+k_n)}(n-1)(\tau_P+\tau_x)}{k_n} \qquad \text{[Expression 4]}$$

$$a_T = \frac{\sum_{r=(k_c+k_r+k_n+1)}^{(k_c+k_r+k_n+k_a)}(a-1)(\tau_P+\tau_x)}{k_a} \qquad \text{[Expression 5]}$$

$$u_T = \frac{\sum_{r=(k_c+k_r+k_n+k_u+1)}^{(k_c+k_r+k_n+k_a+k_u)}(u-1)(\tau_P+\tau_x)}{k_u} \qquad \text{[Expression 6]}$$

The average queuing time for the entire cells of a system can be obtained by using the mathematical expressions 2 through 6.

$$QT_{nm} = \frac{\sum_{i=1}^{k}(i-1)(\tau_P+\tau_x)}{k} \qquad \text{[Expression 7]}$$

Further, an average delay of all cells of a system is obtained by the expression 8, $$MD_{nm} = \frac{\sum_{i=1}^{k}(i\tau_P + (i-1)\tau_x)}{k} \quad \text{[Expression 8]}$$

Meanwhile, the average queuing time of the ATM-based delay adaptive scheduling apparatus and method thereof in accordance with the present invention can be obtained as follows by using the expression 9:

$$QT_{mg} = \frac{\sum_{i=1}^{k}(i-1)(\tau_P + (1-P_d)\tau_x)}{k} \quad \text{[Expression 9]}$$

Further, the average delay of all cells of the system can be obtained by using the expression 10 as follows:

$$MD_{mg} = \frac{\sum_{i=1}^{k}(i\tau_P + (i-1)(1-P_d)\tau_x)}{k} \quad \text{[Expression 10]}$$

Accordingly, a relation between the average delay rate of the conventional service providing method for all the cells of the system and the average delay rate of the ATM-based delay adaptive scheduling apparatus and a method thereof in accordance with the present invention can be expressed by the following expression 11:

$$\frac{MD_{mg}}{MD_{nm}} = \frac{\tau_P + \tau_x(1-P_d)}{\tau_P + \tau_x} \quad \text{[Expression 11]}$$

With Expression 11, the relation between the average delay rate of the conventional service providing method for the entire cells of the system and the average delay rate of the ATM-based delay adaptive scheduling apparatus and a method thereof in accordance with the present invention is expressed by, $$MD_{mg} <= MD_{nm} \quad \text{[Expression 12]}$$

Figure 7:
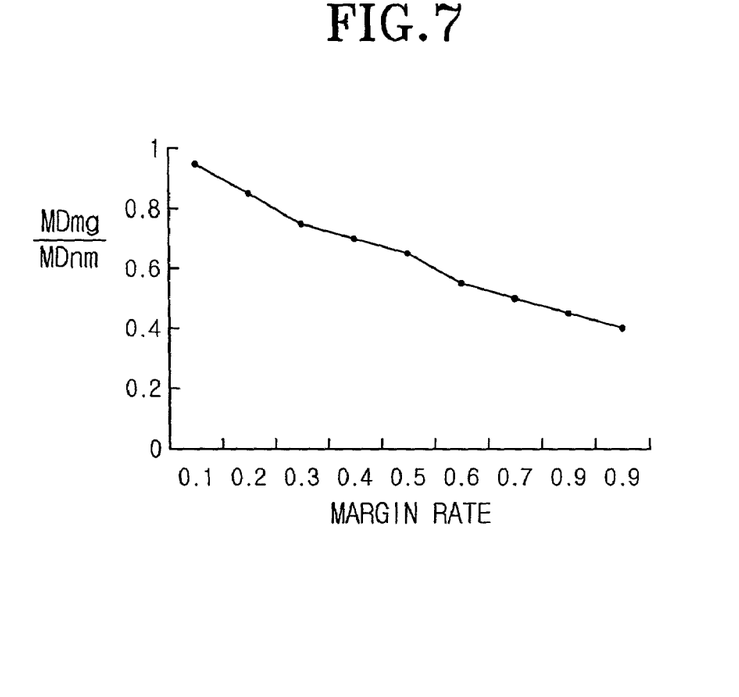
FIG. 7 is a view showing a result obtained with a M/D/1 and with a mathematical expression 12 when a non-blocking ATM self routing switch having a speed of OC-3 is under 80% load.

FIG. 7 is a view showing a result obtained with a M/D/1 and with a mathematical expression 12 when a non-blocking ATM self routing switch having a speed of OC-3 is under 80% load.

As shown in FIG. 7, the cell average delay time is reduced from the conventional method when using the ATM-based delay adaptive scheduling apparatus and the method thereof in accordance with the present invention. The average delay time rate is reduced as the margin rate is increased.

Figure 8:
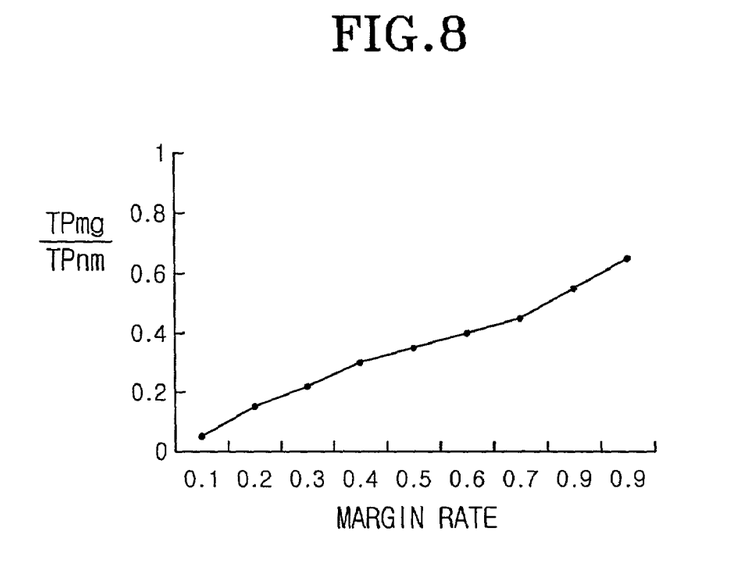
FIG. 8 is a view showing results obtained by the ATM-based delay adaptive apparatus and method thereof in accordance with the present invention and the related art, respectively under the same condition as that of FIG. 7.

FIG. 8 is a view showing results obtained by the ATM-based delay adaptive apparatus and method thereof in accordance with the present invention and related art, respectively under the same condition as that of FIG. 7.

In FIG. 8, $TP_{mg}$ is a cell processing rate in a time section $(t_1, t_2)$ by the ATM-based delay adaptive apparatus and method thereof in accordance with the present invention, while $TP_{nm}$ is a cell processing rate in the time section $(t_1, t_2)$ by the conventional method. FIG. 9 shows that the cell processing rate in the same period of time section is improved by using the ATM-based delay adaptive scheduling apparatus and method thereof in accordance with the present invention.

With the ATM-based delay adaptive scheduling apparatus and method thereof in accordance with the present invention, appropriate QoS is guaranteed for each traffic type under a multi-traffic environment by generating service information of each cell in the form of a tag and determining the order of providing service, and also efficient use of bandwidth is enabled within the current network without incurring an idling bandwidth by using the characteristics of each traffic type. Accordingly, the average delay time for each cell at the switch is reduced, and accordingly, a relatively large amount of data is processed within the same period of time. Overall, performance of the switch is enhanced.

Under the current system, where the arrival rate of data becomes faster than the processing rate, by determining the next service cell at the input end of the switch, the switch simply services the cell output from the outputting portion. Accordingly, the processing time at the switch is reduced. Further, head of line blocking, which is a chronic problem occurred at the input buffer type switch, can be solved, and accordingly, the efficiency of the switch is enhanced.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An asynchronous transfer mode (ATM)-based delay adaptive scheduling apparatus adaptive according to a traffic type, comprising:
    a scheduling portion that categorizes at least one cell according to the traffic type and generates service information including the traffic type, a priority of service provision, and a service finish time;
    a storing portion that stores said at least one cell about which service information is generated;
    an outputting portion that reads said at least one cell, which is to be serviced, from the storing portion, and then outputs the read cell;
    an input/output managing portion that counts said at least one cell that is input to the scheduling portion and output from the outputting portion, and manages an input/output of said at least one cell; and
    a controlling portion that decides whether to service said at least one cell or not based on the service information, and outputs a control signal command to read said at least one cell stored in the storing portion and to output the read cell.

2. The scheduling apparatus of claim 1, wherein the scheduling portion comprises:
    a categorizing portion that categorizes said at least one cell according to the traffic type; and
    a generating portion that generates the service information of said at least one cell including at least one of the traffic type of said at least one cell, the priority of service provision, and the service finish time.

3. The scheduling apparatus of claim 2, wherein the generating portion generates service information including at least one of the traffic type, priority of service provision, and the service finish time for constant bit rate (CBR) cells, and for at least one of real-time variable bit rate (rt-VBR) cells, non real-time variable bit rate (nrt-VBR) cells, available bit rate (ABR) cells, and unspecified bit rate (UBR) cells, the generating portion generates service information including at least one of the traffic type, priority of service provision, the service finish time, and an address of a field where cells are written.

4. The scheduling apparatus of claim 1, wherein the controlling portion comprises:
   an inquiry portion that inquires about the traffic type of said at least one cell in the storing portion according to the service information; and
   a service deciding portion that decides whether to service a cell of low priority or not, by comparing the service finish time of a cell of high priority with the service finish time of all of a plurality of cells based on the result of the inquiry of the inquiry portion,
   wherein a storage address of said at least one cell, which is to be serviced, is output to the outputting portion.

5. The scheduling apparatus of claim 1, wherein the storing portion comprises:
   a first storing portion for storing each of said at least one cell that is allocated with fixed bandwidth;
   a second storing portion for storing each of said at least one cell that is allocated with variable bandwidth.

6. The scheduling apparatus of claim 1, wherein the outputting portion comprises a cell reading portion that reads said at least one cell to be serviced and outputs the read cell to an asynchronous transfer mode (ATM) switch.

7. The scheduling apparatus of claim 1, wherein the input/output managing portion comprises a buffer controlling portion that controls an occupancy capacity of the storing portion below a predetermined threshold by comparing the occupancy capacity with the predetermined threshold, an input cell counting portion that counts the input cell and outputs the cell to the buffer controlling portion, and an output cell counting portion that counts the number of cells output from the outputting portion.

8. A method for asynchronous transfer mode (ATM) based delay adaptation according to a traffic type, comprising:
   (a) categorizing a cell according to the traffic type and generating service information including the traffic type, a priority of service provision, and a service finish time;
   (b) deciding whether to service the cell based on the service information by
      (b1) inquiring about the traffic type according to the service information;
      (b2) deciding whether to service a cell of low priority by comparing the service finish time of a cell of high priority with the service finish time of all cells; and
      (b3) outputting a storage address of the cell to be serviced;
   (c) outputting the cell to be serviced.

9. The method of claim 8, wherein the steps (b1) through (b3) are repeated with respect to a cell of high priority when there is no cell of low priority.

10. The method of claim 8, wherein in the sub-step (b3), the cell is output to an asynchronous transfer mode (ATM) switch.

11. A method for asynchronous transfer mode (ATM) based delay adaptation according to a traffic type, comprising:
   (a) categorizing a cell according to the traffic type and generating service information including the traffic type, a priority of service provision, and a service finish time;
   (b) deciding whether to service the cell based on the service information;
   (c) outputting the cell to be serviced; and
   (d) comparing an occupancy capacity of a storing means where the cell is stored, with a predetermined threshold, and regulating the occupancy capacity below the predetermined threshold, wherein the occupancy capacity of the storing means is obtained by counting a number of input cells.

* * * * *